United States Patent [19]
Miller

[11] Patent Number: 5,529,377
[45] Date of Patent: Jun. 25, 1996

[54] AIR CELL MODULE FOR AUTOMOTIVE SEAT

[75] Inventor: Paul Miller, Cookeville, Tenn.

[73] Assignee: McCord Winn Texton, Winchester, Mass.

[21] Appl. No.: 82,445

[22] Filed: Jun. 25, 1993

[51] Int. Cl.⁶ .................................................... A47C 4/54
[52] U.S. Cl. ........................... 297/284.6; 297/DIG. 3
[58] Field of Search ........................... 297/284.6, DIG. 3; 5/341, 348, 443

[56] References Cited

U.S. PATENT DOCUMENTS

| | | | |
|---|---|---|---|
| 2,826,767 | 3/1958 | Edwards | 5/341 |
| 3,391,414 | 7/1968 | Gordon | 5/348 |
| 4,444,430 | 4/1984 | Yoshida et al. | 297/284 |
| 4,538,854 | 9/1985 | Wilson | 297/354 |
| 4,707,027 | 11/1987 | Horvath et al. | 297/284.6 |
| 4,722,550 | 2/1988 | Imaoka et al. | 280/727 |
| 4,746,168 | 5/1988 | Bracesco | 297/284.6 X |
| 4,840,425 | 6/1989 | Noble | 297/284 |
| 4,873,737 | 10/1989 | Savenije | 5/443 |
| 4,938,528 | 7/1990 | Scott | 297/284.6 |
| 5,076,643 | 12/1991 | Colasanti et al. | 297/284 |

FOREIGN PATENT DOCUMENTS

| | | | |
|---|---|---|---|
| 460338 | 11/1993 | France. | |
| 3402472 | 8/1985 | Germany | 297/284.6 |
| 2250154 | 4/1994 | Germany. | |

*Primary Examiner*—Laurie K. Crammer
*Attorney, Agent, or Firm*—Reising, Ethington Barnard & Perry

[57] ABSTRACT

A unit handled air cell assembly or module is mounted on a backplate or other suitable support of an automotive seat back. The module comprises an air cell, an electric motor driven air pump, a solenoid valve and a reversible electric pigtail for connecting the electric motor and the solenoid valve to a control circuit. The electric motor driven air pump is disposed inside the air cell and operatively connected to an air tube that extends out of the air cell. The solenoid valve is connected to the exterior end of the air tube to control the flow of air to and from the air cell. The electric motor driven air pump is shaped so as to fit in a cut-out of the back plate or support and avoid discomfort to the seat occupant. In a second embodiment, the electric motor driven air pump is disposed in a plastic sleeve that is attached to the air cell and the solenoid valve is attached to the outlet end of the air pump.

8 Claims, 3 Drawing Sheets

AIR CELL MODULE FOR AUTOMOTIVE SEAT

BACKGROUND OF THE INVENTION

This invention relates generally to automotive seats and more particularly to automotive seats that include air cells to adjust the comfort of the seat.

U.S. Pat. No. 4,444,430 granted to Youki Yoshida and Kenji Ichikawa Apr. 24, 1984 discloses an automotive seat that has a pneumatic component in the form of an air cell type lumbar support that is embedded or housed in the lower portion of a seat back. The air cell is pressurized to a desired degree to conform the curvature and hardness of the surface of the seat back to the preference of the seat occupant. The air cell is inflated by manipulating a handle or lever that expands and contracts a manual pump that is fixedly mounted in a space in the upper portion of the seat back. The air cell is deflated by pushing a button in the end of the lever that opens a vent.

This pneumatic lumbar support system has several drawbacks from a practical standpoint. The system has several components, such as an air cell, pump, lever assembly and hoses that are individually mounted on the seat back and assembled in place. This is a costly and time consuming process that is not compatible with the quick pace of a modern assembly line. The pressurization of the air cell is also to adjust primarily because the air pump is manually operated by a lever that is not conveniently located for operation by the seat occupant.

U.S. Pat. No. 4,722,550 granted to Naohiro Imaoka and Hitoshi Nakashima Feb. 2, 1988 discloses an automotive seat that has several air cells disposed within the seat for changing the hardness or resiliency of the seat cushion and the seat back. The seat back includes an air pump that is mounted on the frame of the seat back by brackets and that is connected to each of the air cells by an air supply means and a main air pipe for controlling the supply of air to the air cells. Each air cell can be controlled in hardness manually by a manual operation switch or automatically by speed and steering angle sensors and a controller.

This patent does not disclose any construction details of the air pump or the manner in which it is manually controlled by the manual operation switch. However, the patent does appear to suggest the use of an electric motor driven air pump that is controlled by an electric switch that is mounted on the side of the seat.

This system also has several drawbacks even though it does not appear to require a manually operated pump. It also consists of several components that are individually mounted on the seat back and assembled in place which is a costly and time consuming process that is not compatible with modern assembly line speeds as printed out above. Moreover, the system is not disclosed in sufficient detail to show how the system can be incorporated into the seat in a practical manner.

U.S. Pat. No. 4,840,425 granted to Roger H. Noble Jun. 20, 1989 discloses a cushioned seating assembly that includes a seat support cushion and a back support cushion and a control assembly that controls inflation and at least partial deflation within the cushioned support assembly through supply/exhaust lines. The cushioned seating assembly may be used in association with existing power and fluid pressure sources as shown in FIG. 4 of the patent or in association with an internal power fluid pressure source as shown in FIG. 5. This latter alternative includes an electric motor driven air compressor and solenoid air valve.

However, the patent does not disclose if or how the electric motor driven air compressor and solenoid is incorporated into the seat much less how these components can be incorporated into the seat in a practical manner to accommodate the quick pace of a modern production line.

SUMMARY OF THE INVENTION

The object of this invention is to provide an air cell and all the major ancillary equipment for inflating and deflating the air bag as a unit handled assembly or module that is compact for easy shipment and handling and that can be attached to an automotive seat quickly and easily in a production line environment.

A feature and advantage of the invention is that the air cell module of this invention includes an electric motor driven air pump, a solenoid valve, and an electric pigtail so that the module can be connected to an existing electrical control circuit that includes an electrical power source and a remote electrical control switch easily.

Another feature and advantage of the invention is that the air cell module of the invention includes an electric motor driven air pump, a solenoid valve, and an electric pigtail for connection to an electrical control circuit so that the module is particularly well suited for use with adjustable automotive seats that are positioned and oriented in the vehicle by electric motors.

Yet another feature and advantage of the invention is that the air bag module of the invention includes an electric motor driven air pump that is shaped so as to fit in a cut-out of a support plate in a vehicle seat and avoid any danger of being a source of discomfort to the seat occupant.

Still yet another feature and advantage of the invention is that the air bag module of the invention uses a single solenoid valve and a reversible air pump to inflate and deflate the cell.

Still yet another feature and advantage of one embodiment of the invention is that the air pump module of the invention has an electric motor driven air pump that is disposed inside the air cell and a single solenoid valve near the air cell to provide a compact design to facilitate handling and shipment and to reduce space requirements in the seat.

Still yet another feature of another embodiment of the invention is that the air pump module has an electric motor driven air pump that is housed in a sleeve that is attached to the air cell and a single solenoid valve that is attached to the air pump to provide a compact design that facilitates handling and shipment and reduces space requirements in the seat.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
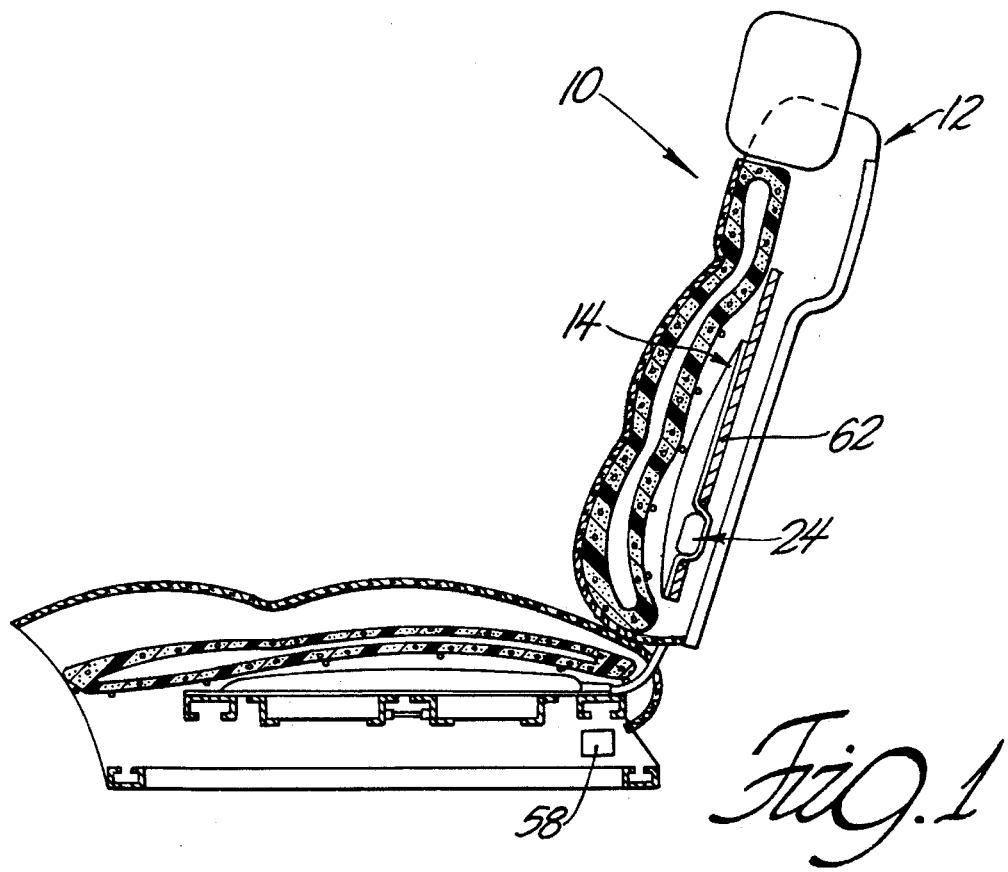
FIG. 1 is a sectional side view of an automobile seat having a seat back equipped with an air cell module of the invention.
Figure 2:
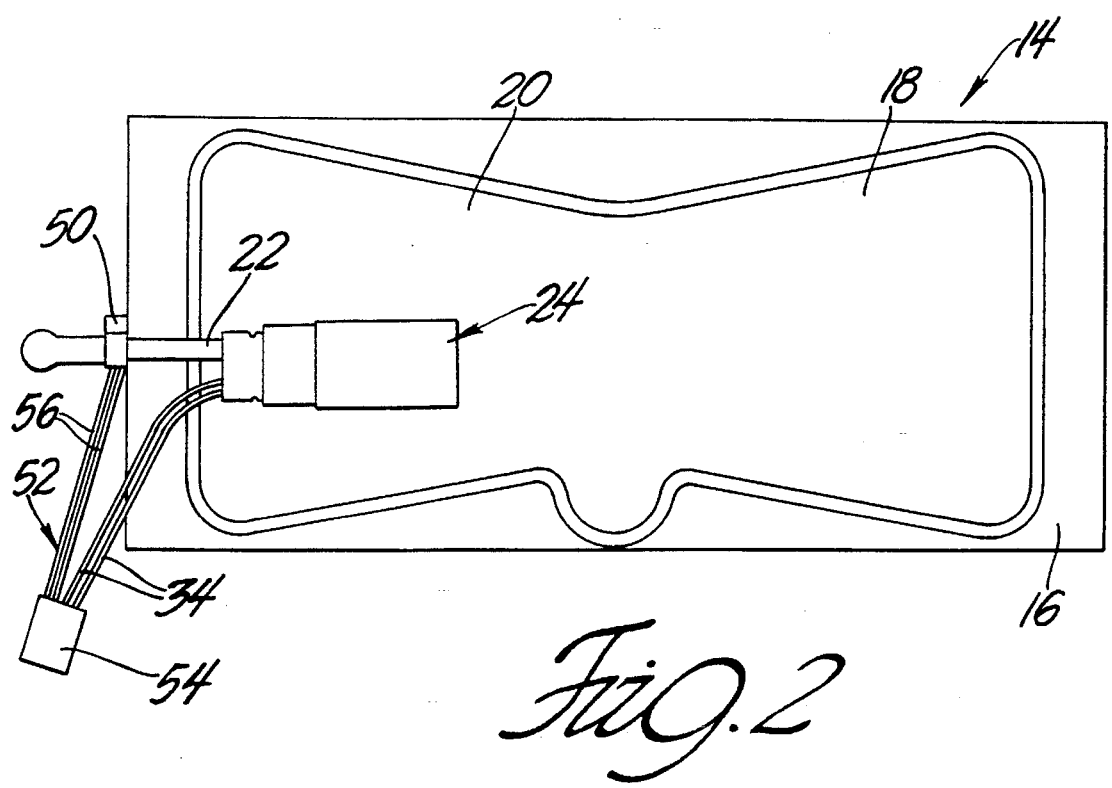
FIG. 2 is a front view of the air cell module shown in FIG. 1.

Referring now to the drawing, FIG. 1 shows a sectional side view of an automobile seat 10 that has a seat back 12 that is equipped with unit handled air cell assembly or module of the invention that is indicated generally at 14.

The air cell module 14 comprises a flexible plastic backing member 16 and a bow-tie shaped plastic membrane 18 that is electronically welded or otherwise suitably secured to the backing member 16 at its periphery in a conventional manner to form an air cell 20. The air cell 20 has a plastic air tube 22 that extends through the seam between the backing member 16 and the plastic membrane 18 at the periphery of the air cell. The air tube 22 is welded to adjacent portions of the backing member 16 and the plastic membrane 18 in the seam so that the air tube 22 is embraced in an air tight manner.

The air cell module 14 further comprises an electric motor driven air pump subassembly 24 that is disposed inside the air cell 20 and welded in place. The electric motor driven air pump subassembly 24 is preferably welded to the backing member 16 but it can be welded to the plastic membrane 18 instead so long as it is held in a relatively fixed location. The electric driven air pump assembly 24 is operatively connected to the air tube 22 as explained below.

Figure 3:
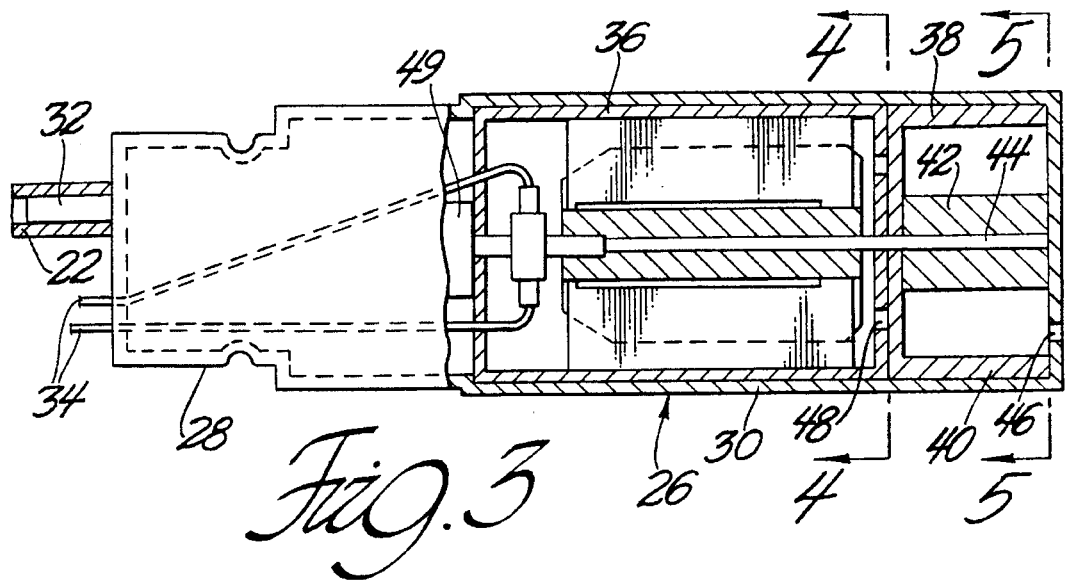
FIG. 3 is an enlarged, partially sectioned side view of the air cell module shown in FIG. 2.
Figure 4:
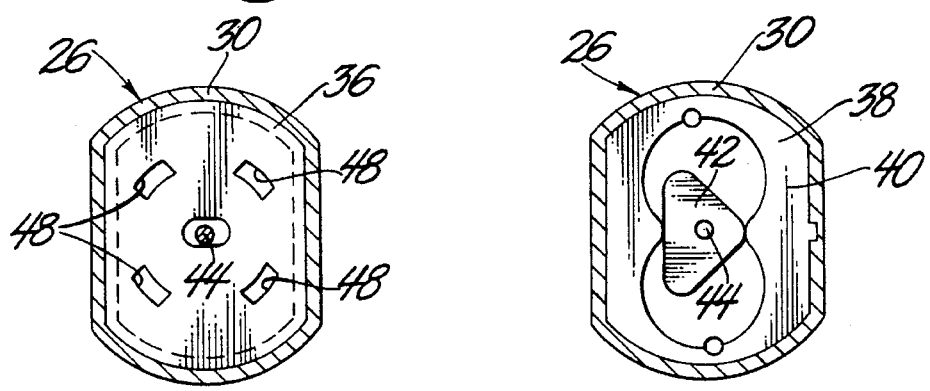
FIG. 4 is a section taken substantially along the line 4—4 of FIG. 3 looking in the direction of the arrows.
Figure 5:
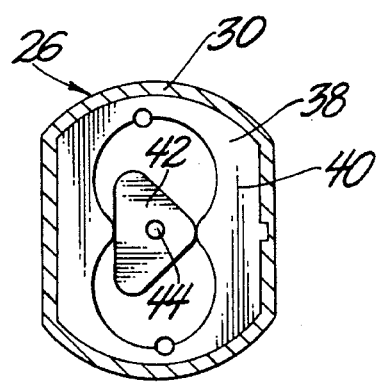
FIG. 5 is a section taken substantially along the line 5—5 of FIG. 3 looking in the direction of the arrows.

The electric motor driven air pump subassembly 24 is shown in detail in FIGS. 3, 4 and 5. It comprises a two-piece cylindrical housing 26 comprising cup-shaped pieces 28 and 30 that are ultrasonically welded together. The housing 26 is preferably of oval cross section as shown in FIGS. 4 and 5 to reduce the width of the housing 26 and provide flat sides to avoid discomfort to a seat occupant as explained below.

The end wall of housing piece 28 has an integral tubular inlet pipe 32 that is inserted into the end of the air tube 22. This end wall also has a sealed exit opening for electric leads 34 that are attached to an end of an electric motor 36 inside the housing 26.

The subassembly 24 also has a "wankle" type air pump 38 that is attached to the opposite end of the electric motor 36. The air pump 38 and electric motor 36 are slid into the housing piece 30 as a unit. The air pump 38 comprises a cup or housing 40 that has a bi-lobular chamber, a triangular rotor 42 disposed in the chamber, and a crank 44 for driving the rotor 42. The cup 40 is keyed in the housing piece 30 as shown in FIG. 4 so that the air pump 38 is located correctly with respect to an outlet 46 in the end wall of the housing piece 30.

The air pump 38 operates in a well known manner so that the operation need not be described in detail. Suffice it to state the crank 44 is drivingly connected to an output shaft of the electric motor 36 that moves the rotor 42 in the chamber of the housing 40 in an orbital manner when the shaft rotates. The electric motor 36 itself does not require a key because it can be installed as shown or rotated 180 degrees and installed. Either way the corresponding oval shapes of the electric motor 36 and the housing piece 30 cooperate to locate air passages 48 extending through the electric motor 36 so that fluid communication is established between inlet pipe 32 and ports 48 of the air pump 38.

The housing piece 28 has a central post 49 that engages the end of the electric motor 36 to hold the electric motor and the air pump 38 in place inside the housing 26. The housing piece 28 also has plenty of room for the electric leads 34 as well as other electrical components such as capacitors that may be needed or desired.

The air cell module 14 further comprises a solenoid valve 50 and an electric pigtail 52. The solenoid valve 50 is disposed outside the air cell 20 and connected to the exterior end of the air tube 22 to control the flow of air to and from the air cell 20. The electric pigtail 52 has an electrical connector 54 that is attached to electric leads 56 for operating the solenoid valve 50 and to the electric leads 34 that are connected to the electric motor 36 inside the air cell The electrical connector 54 is plugged into a socket 58 of an existing conventional electrical control circuit to connect the electric motor 36 and the solenoid valve 50 to a remote electric power source and a remote control switch 60.

The control switch 60 is conveniently located on the side of the seat occupant for operation by the seat cushion to adjust the pressure of the air cell 20. The air cell is preferably inflated and deflated by a pump system that uses a reversible electric motor and air pump and a single solenoid valve that are controlled by a two-position switch. The advantage of such a system is that the deflation rate is quick and matches the inflation rate. Also the air cell can be fully evacuated and the seat occupant senses power operation on inflation and deflation.

The air cell module 14 is mounted on a backplate 62 or other suitable support of the seat back 12 that has a cut-out. The air cell module 14 is mounted so that the air cell 20 lies flat against the backplate 62 and the air pump subassembly 24 fits in the cut-out with that the flat sides of the oval shaped housing 26 parallel to the front surface of the backplate 62. This arrangement guards against any discomfort to the seat occupant.

Figure 7:
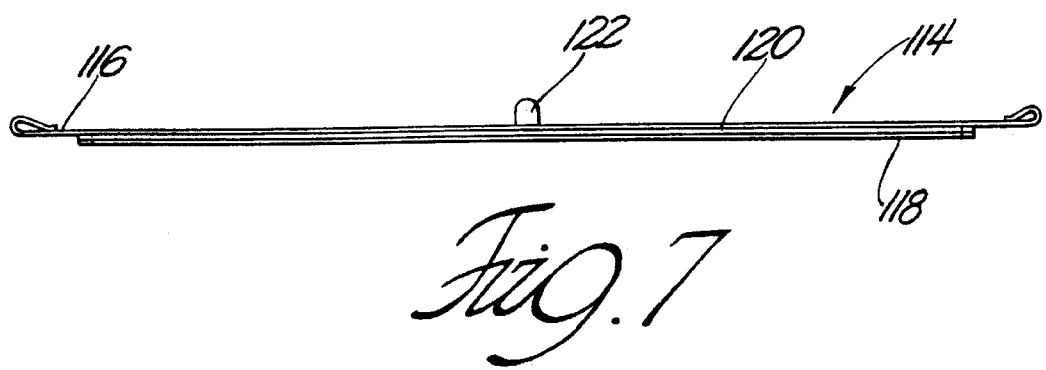
FIG. 7 is a top view of the air cell module taken substantially along the line 7—7 of FIG. 6 looking in the direction of the arrows.
Figure 6:
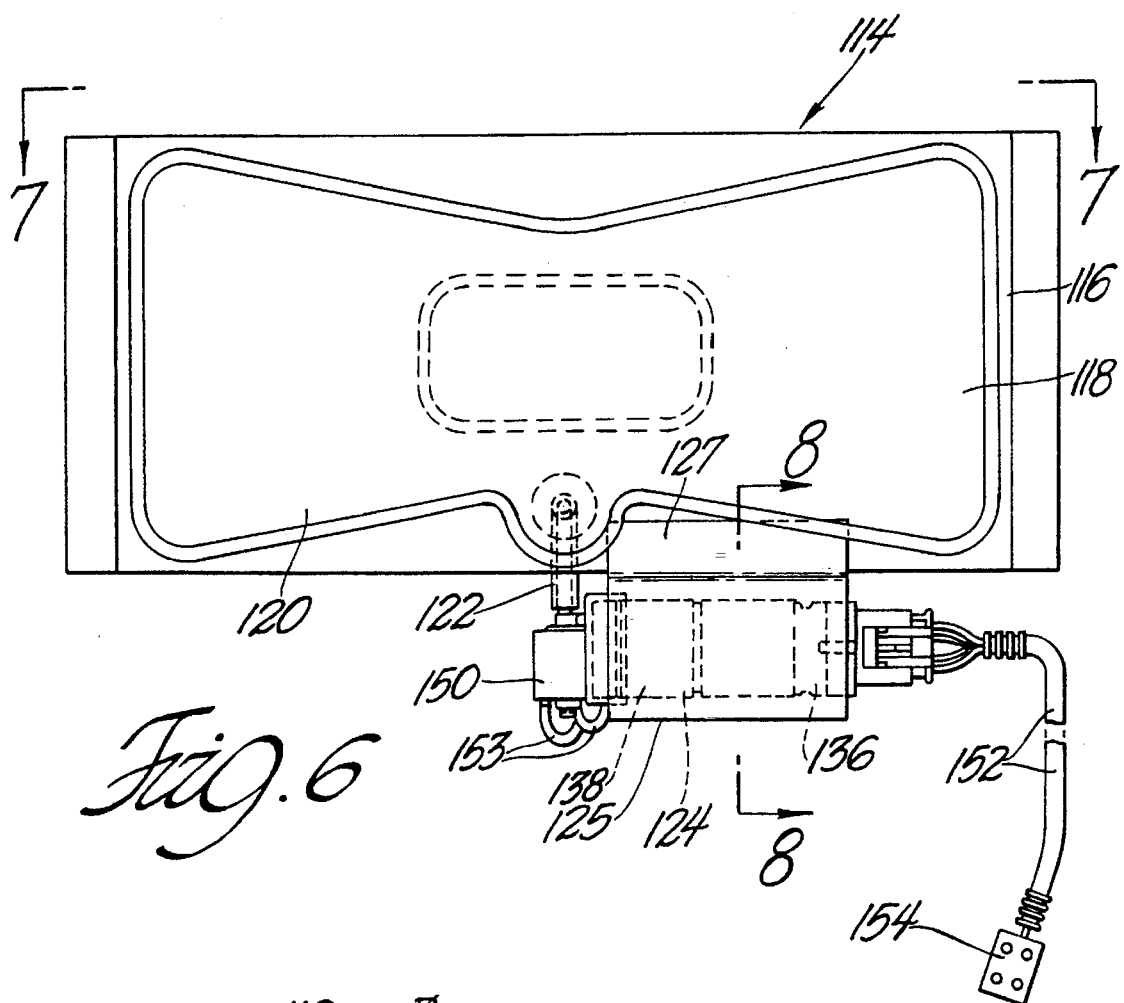
FIG. 6 is a front view of another air cell module in accordance with the invention.
Figure 8:
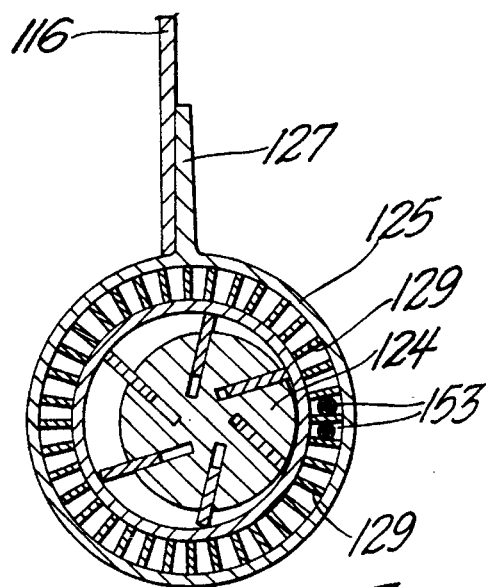
FIG. 8 a section taken substantially along the line 8—8 of FIG. 6 looking in the direction of the arrows.

A second embodiment of the invention is shown in FIGS. 6, 7 and 8. Referring now to these figures, the unit handled air cell assembly or module 114 of this second embodiment of the invention comprises a flexible plastic backing member 116 having a bow-tie shaped plastic membrane 118 secured to it in a suitable manner form an air cell 120. An L-shaped plastic air tube 122 extends through a wall of the air cell 120 that is part of the backing member 116. The module 114 further comprises an electric motor driven air pump subassembly 124 that is disposed inside a plastic tube 125 that is attached to the backing member 116 by means of an integral flange 127. The subassembly 124 is held inside the plastic tube 125 by internal fins 129. These fins provide a flexible mounting for the pump and sound attenuation to quiet the pump during operation.

The subassembly 124 includes a reversible electric motor 136 drivingly connected to a reversible air pump 138, such as a conventional vane pump comprising an offset rotor having a plurality of radial vanes that engage the wall of a circular chamber and reciprocate in and out of the rotor as it rotates in the circular chamber.

The air cell module 114 further comprises a solenoid valve 150 that is mounted on the end of the air pump 138 and fluidly connected to the outlet of the air pump. The solenoid valve 150 has an outlet that is inserted into the exterior end of the air tube 122.

The air cell module 114 also includes an electric pigtail 152 that plugs into the end of the electric motor 136 for electrical connection to the electric motor 136 and that includes electric leads 153 running between the fins 129 for electrical connection to the solenoid valve 150. The free end of the pigtail 152 has an electrical connector 154 for plugging the air cell module 114 into an existing electrical control circuit.

The air cell module 114 is attached to the backplate of a seat back in the same manner as the air cell module 14 shown in FIG. 1 and the electrical connector 154 is plugged into the electrical socket 58 in the same way.

However, in this instance, the plastic sleeve 125 also fits into the cut-out of the backplate to guard against discomfort for the seat occupant.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A unit handled air cell module comprising:

a flexible backing member having a membrane secured to it to form an air cell, an air tube extending through a wall of the air cell, an electric motor driven air pump fluidly connected to the air tube, a solenoid valve fluidly connected to the air tube to control the flow of air to and from the air cell, and an electric pigtail having electric leads for the electric motor driven air pump and the solenoid valve and an electrical connector for connecting the electric leads to a control circuit having a remote electric power source and a remote control switch for operating the air cell module, a backplate of a seat back, said backplate having a cut-out, and said flexible backing member mounted on said backplate so that said electric driven air pump is disposed in the cutout.

2. The unit handled air cell module as defined in claim 1 wherein the electric driven air pump is disposed in the air cell and a portion of the air cell is disposed in the cutout along with the electric driven air pump.

3. The unit handled air cell module as defined in claim 1 wherein the electric driven air pump has a housing with flat sides and wherein the electric driven air pump is disposed in the cutout with the flat sides parallel to said backplate.

4. The unit handled air cell module as de-fined in claim 1 wherein the electric driven air pump is disposed in a sleeve attached to the air cell and the sleeve is disposed in the cutout along with the electric driven air pump.

5. A unit handled air cell module comprising:

a flexible backing member having a membrane secured to it to form an air cell, a sleeve secured to the flexible backing member, an electric motor driven air pump disposed in the sleeve, a solenoid valve that is mounted on the electric motor driven air pump at one end and fluidly connected to an outlet of the electric motor driven air pump to control the flow of air to and from the air cell, an air tube fluidly connecting the solenoid valve to the air cell, and an electric pigtail that is attached to the electric motor driven air pump at the opposite end, the electric pigtail having electric leads for the electric motor driven air pump and the solenoid valve and an electrical connector for connecting the electric leads to a control circuit having a remote electric power source and a remote control switch for operating the air cell module.

6. The unit handled air cell module as defined in claim 5 wherein the sleeve is attached to the backing member close to the air cell to provide a compact design.

7. The unit handled air cell module as defined in claim 6 wherein the sleeve has a plurality of radial fins that support the electric motor driven air pump inside the sleeve.

8. The unit handled air cell module as defined in claim 5 wherein the sleeve has a plurality of radial fins that support the electric motor driven air pump inside the sleeve.

* * * * *

UNITED STATES PATENT AND TRADEMARK OFFICE
CERTIFICATE OF CORRECTION

PATENT NO. : 5,529,377
DATED : June 25, 1996
INVENTOR(S) : Paul D. Miller

It is certified that error appears in the above-indentified patent and that said Letters Patent is hereby corrected as shown below:

Column 1, line 29, after "also", insert -- difficult --.

Column 4, line 20, after "cell" insert -- 20. --.

Signed and Sealed this

Eleventh Day of February, 1997

Attest:

BRUCE LEHMAN

Attesting Officer      Commissioner of Patents and Trademarks